Jan. 8, 1963

F. J. HIORNS 3,072,348

APPARATUS FOR THE DISINTEGRATION OF SOLID PARTICLES

Filed April 18, 1960

INVENTOR
F. J. HIORNS
BY
Holcombe, Wittcoff Brisebois
ATTORNEYS

INVENTOR
F. J. HIORNS
BY
ATTORNEYS

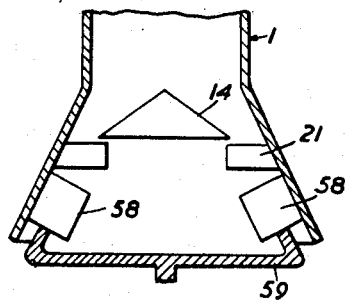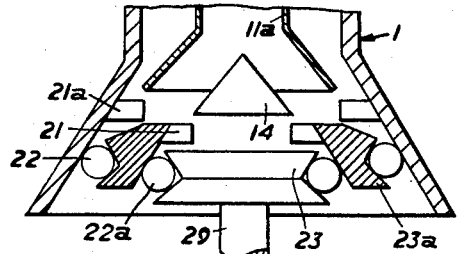
FIG. 5.   FIG. 6.
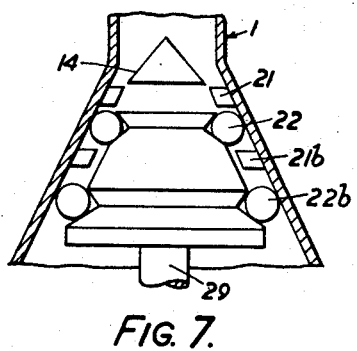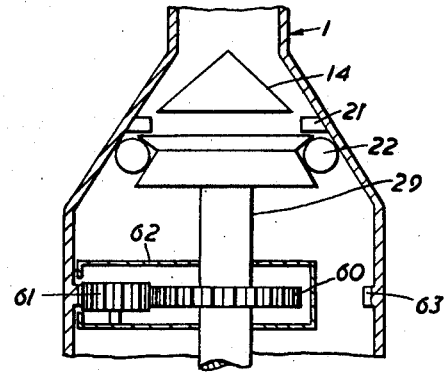
FIG. 7.   FIG. 8
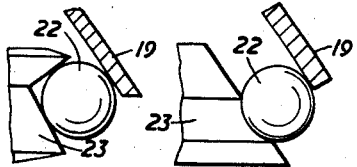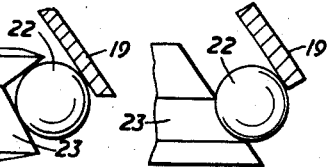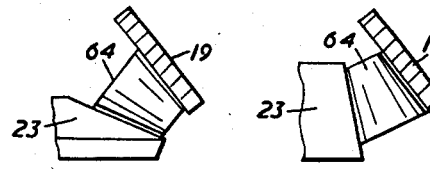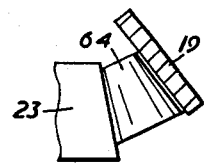
FIG. 9.   FIG. 10.   FIG. 11.   FIG. 12.
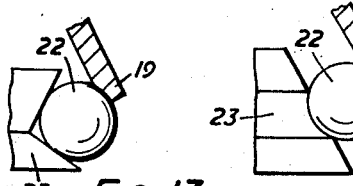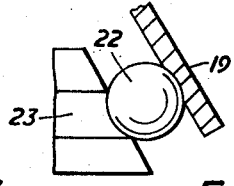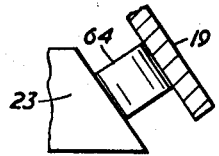
FIG. 13   FIG. 14.   FIG. 15

3,072,348
APPARATUS FOR THE DISINTEGRATION OF
SOLID PARTICLES
Frederick John Hiorns, Little Bookham, England, assignor to C.U.R.A. Patents Limited, Leatherhead, England
Filed Apr. 18, 1960, Ser. No. 22,920
Claims priority, application Great Britain Apr. 21, 1959
7 Claims. (Cl. 241—103)

The invention relates to an apparatus for disintegrating solid particles.

The invention provides an apparatus for disintegrating solid particles which comprises rotating an extended disintegration member having an extended disintegration surface in the form of a surface of revolution to cause relative rotation about the axis of the said surface between the extended disintegration member and a series of rotary disintegration members arranged about the said axis, feeding the particles onto the extended disintegration surface, maintaining the particles in contact with the extended disintegration surface by centrifugal force until they enter the disintegration zone between the extended disintegration surface and the surfaces of the rotary disintegration members, causing the particles to enter the disintegration zone in a thin layer (as hereinafter defined), and causing the particles to pass through the disintegration zone at least in part under the action of centrifugal force.

By a "thin layer" is meant a layer such that substantially all the particles are in direct contact with the extended disintegration surface. Accordingly, the particles that undergo disintegration are acted upon directly by the opposing surfaces of the extended disintegration member and the rotary disintegration members, instead of a mass of contacting particles being urged one against another between opposing disintegration surfaces, as is the case with the usual types of disintegrators.

The invention also provides apparatus for disintegrating solid particles, which comprises an extended disintegration member having an extended disintegration surface in the form of a surface of revolution, a series of rotary disintegration members arranged about the axis of the extended disintegration surface, guide means for the rotary disintegration members, driving means for causing the extended disintegration member to rotate about the said axis, and means for feeding the particles onto the extended disintegration surface in such manner that they have a component of revolution about the said axis in the same direction as the direction of rotation of the extended disintegration member, that they are maintained in contact with the extended disintegration surface by centrifugal force until they enter the disintegration zone between the extended disintegration surface and the surfaces of the rotary disintegration members and that they enter the disintegration zone in a thin layer (as hereinbefore defined), the diameter of the extended disintegration surface increasing continuously through the disintegration zone in the direction of feed of the particles.

Because the particles are carried to the disintegration zone on the extended disintegration surface against which they are held by centrifugal force, they are carried round with the surface and so enter the bights between the extended disintegration surface and the surfaces of the rotary disintegration members from what may be termed the "nipping" side so that the movement of the extended disintegration surface tends to carry the particles into the bights. The fact that the particles are held against the extended disintegration surface by centrifugal force ensures that they do not bounce off the surface even when the rotational speed of the extended disintegration member is high.

Because the diameter of the extended disintegration surface increases continuously through the disintegration zone, the centrifugal force exerted on the particles tends to assist their passage through the disintegration zone.

The extended disintegration surface may be frusto-conical with the feeding means arranged to feed the solid particles onto the extended disintegration surface on the side of the disintegration zone on which the radius of the extended disintegration surface is less than at the disintegration zone.

The rotary disintegration members may be balls or rollers. When they are balls, the guide means may comprise a ring having at least two tracks each of which makes point contact only with each ball. When the rotary disintegration members are rollers, they are advantageously journalled in the guide means.

Advantageously, the guide means is mounted so as to be rotatable about the said axis and there is provided additional driving means for causing the guide means to rotate in a direction opposite to the direction of rotation of the extended disintegration member. Preferably, the additional driving means is separate from the first-mentioned driving means. The additional driving means may comprise gearing coupling the guide means to the extended disintegration member. In this way it is possible to achieve a very high rate of relative rotation between the extended disintegration member and the surfaces of the rotary disintegration members without having so high an absolute rate of rotation of the rotary disintegration members about the said axis that the centrifugal force urging the rotary disintegration members against the extended disintegration surface becomes unduly high.

Advantageously, there are provided resilient means for urging the guide means axially in one direction to press the rotary disintegration members against the extended disintegration surface, and positive stop means arranged to limit axial movement of the guide means in the opposite direction. The resilient means may comprise a spring or springs, or hydraulic or pneumatic means, and is preferably adjustable.

Advantageously, the axis of the extended disintegration surface is vertical and the feeding means is arranged to feed the solid particles onto the extended disintegration surface above the disintegration zone so that they move through the disintegration zone in part under the action of gravity.

The feeding means advantageously comprises vanes arranged to rotate about the said axis in the direction of rotation of the extended disintegration member and means for directing the solid particles onto the extended disintegration surface through the path of the vanes. The vanes are preferably mounted on the extended disintegration member and, when the said axis is vertical, the vanes advantageously terminate at the top in sharp edges. When the said axis is vertical, the particle-directing means may include a conical member mounted above the vanes so that its axis coincides with the said axis and it tapers upwardly, and the feeding means may include a conduit mounted coaxially with and above the conical member for feeding the solid particles onto the surface of the conical member.

There may be provided one or more additional guide means and associated series of rotary disintegration members so arranged about the said axis as to form one or more additional disintegration zones with one or more extended disintegration surfaces in the form of surfaces of revolution, the disintegration zones being arranged one within another, the feeding means being arranged to feed some of the solid particles to each disintegration zone along the extended disintegration surface of the disintegration zone, and the driving means being arranged to cause rotation about the said axis of each of the extended disintegration surfaces. In this way a greater part of the cross-sectional area of the apparatus in a direction perpendicular to the said axis is used than is the case if there is only one disintegration zone. The, or each, additional extended disintegration surface may be formed either on the said extended disintegration member or on one or more additional extended disintegration members.

There may also be provided one or more additional disintegration zones formed by one or more additional guide means and associated series of rotary disintegration members and the said extended disintegration surface or additional extended disintegration surfaces, the arrangement being such that the solid particles pass through these disintegration zones in turn.

Several forms of apparatus for disintegrating solid particles and constructed in accordance with the invention will now be described in greater detail by way of example with reference to the accompanying drawings in which:

FIGS. 5 to 8 are each diagrammatic axial sections of portions of other forms of apparatus; and FIGS. 9 to 15 are fragmentary views on a larger scale showing different forms and arrangements of the disintegrating members.

Figure 1:
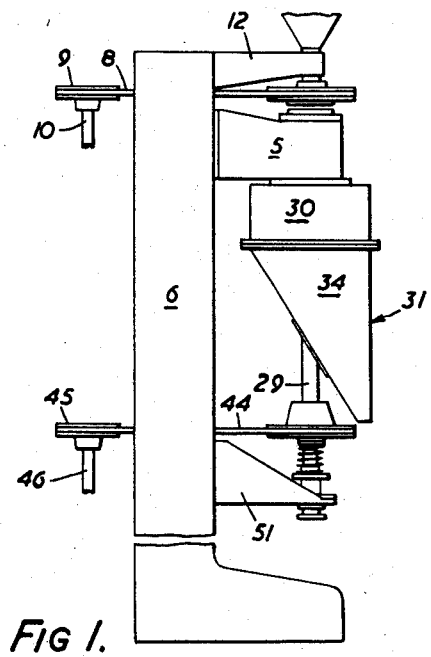
FIG. 1 is a diagrammatic side elevation of one form of apparatus.
Figure 4:
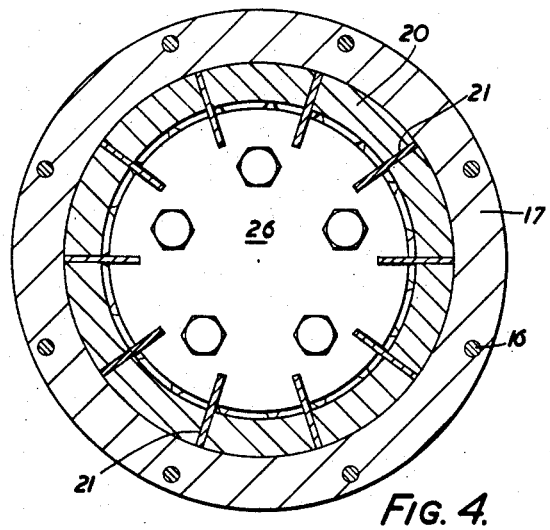
FIG. 4 is a section on the line 4—4 in FIG. 2.

Referring to FIGS. 1 to 4 of the drawings, the first form of the apparatus comprises a tubular member, which is indicated generally by the reference numeral 1 and is mounted with its axis vertical. The upper part 2 of the tubular member 1 is cylindrical and the lower part 3 is frusto-conical tapering upwardly. The cylindrical part 2 of the tubular member 1 is rotatably journalled within a ball-bearing axle box 4, which is fixed by a bracket 5 to a main frame 6. Fixed to the cylindrical part 2 of the tubular member 1 above the axle box 4 is a pulley 7 having a circumferential groove in which there runs an endless driving belt 8, which transmits drive from a similar pulley 9 mounted on a vertical shaft 10 coupled to a driving motor (not shown).

Mounted coaxially within and spaced from the cylindrical part 2 of the tubular member 1 is a cylindrical feed tube 11 which, just above the top of the tubular member 1, is fixed to a bracket 12 extending from the main frame 6. Above the bracket 12, the feed tube 11 is flared outwardly to facilitate the introduction of the solid particles. Secured to the lower end of the feed tube 11 by three vertical pins 13, which are equally spaced around the feed tube 11, is a conical member 14 which is coaxial with the feed tube 11, and of which the apex is at the top, the semi-angle of the cone being 45°.

At its lower end, the tubular member 1 terminates in an outwardly extending annular flange 15, which has holes arranged around its periphery to receive bolts 16. Mounted directly beneath the outer part of the flange 15 are two rings 17 and 18 arranged one above the other. The bolts 16 make a close fit in bores in the upper ring 17 and are screw-threaded towards their lower ends to engage internally screw-threaded bores in the lower ring 18. Thus the two rings 17 and 18 are rigidly secured to the flange 15. On the inside, the upper ring 17 is recessed at the bottom and the lower ring 18 is recessed at the top to receive a grinding ring 19 made of a hard steel. Mounted between the grinding ring 19 and the inner part of the annular flange 15 is an annular insert 20 of which the lower part is slotted to receive a number of vertical rectangular steel vanes 21 which extend radially inwards with respect to the said axis and of which the inner top corners are close to the lower edge of the conical member 14. At the top, the vanes 21 terminate in sharp edges so that they present only a small obstruction to the particles. The inner surfaces of the frusto-conical part 3 of the tubular member 1, the annular insert 20, the grinding ring 19 and the lower ring 18 (below the recessed part) together form a single frusto-conical surface, which makes an angle of 60° with the horizontal.

Running on the inner surface of the grinding ring 19 are a number of balls 22, which are held against the inner or grinding surface of the grinding ring 19 by a guide ring 23 made of a hard steel. The guide ring 23 has two frusto-conical guiding surfaces 24 and 25, of which the upper surface 24 is inclined upwardly and outwardly at an angle of 15° to the vertical and the lower surface 25 is inclined outwardly and downwardly at an angle of 15° to the horizontal so that the two guiding surfaces 24 and 25 are each inclined at the same angle (45°) to a normal to the inner surface of the grinding ring 19 through the circle containing the points of contact of the ball 22 with the inner surface of the grinding ring 19. Each ball 22 makes contact with each of the guiding surfaces 24 and 25, the balls 22 roll on all three of these surfaces with little or no slip.

The guide ring 23 is mounted in a recess formed in the outer part of two circular discs 26 and 27, which rest on a third and smaller disc 28 which is welded to the top of a vertical shaft 29. The three discs 26, 27 and 28 are securely bolted together and their axes, together with that of the shaft 29, coincide with the said axis.

Figure 2:
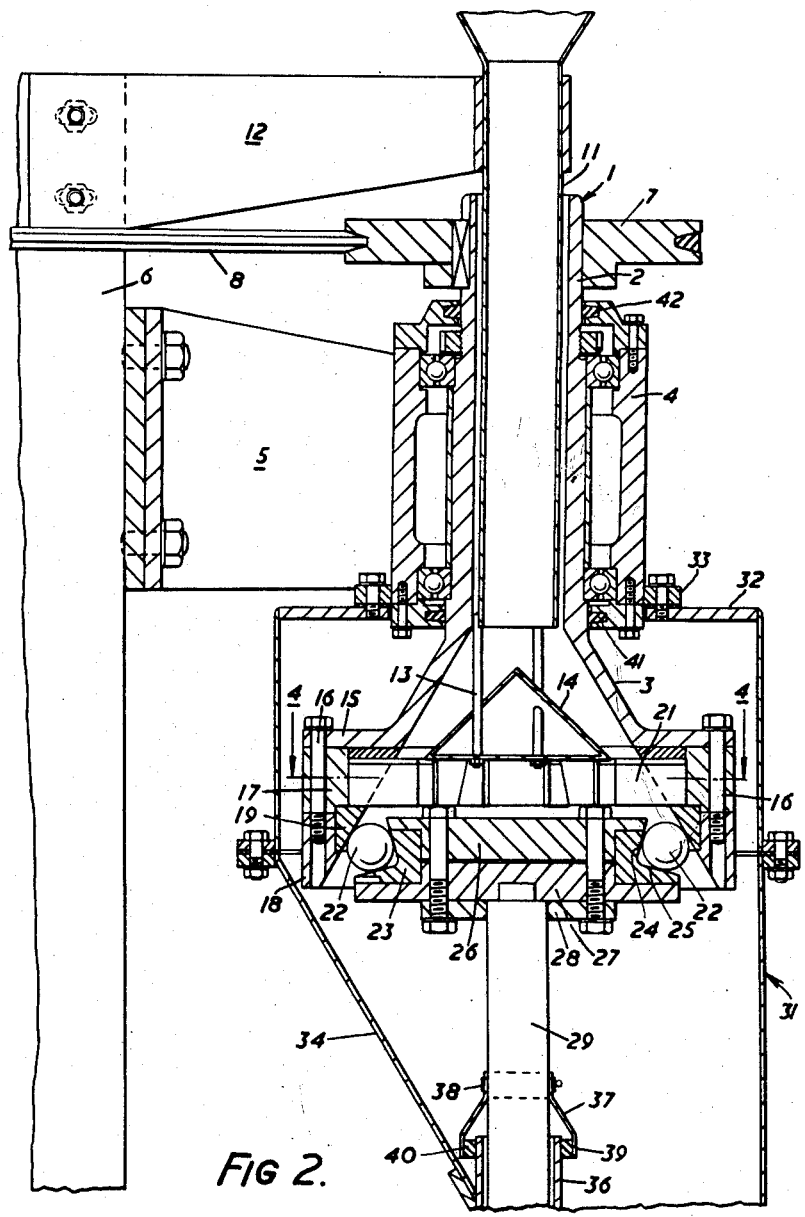
FIG. 2 is an axial section of the upper part of the apparatus shown in FIG. 1.
Figure 3:
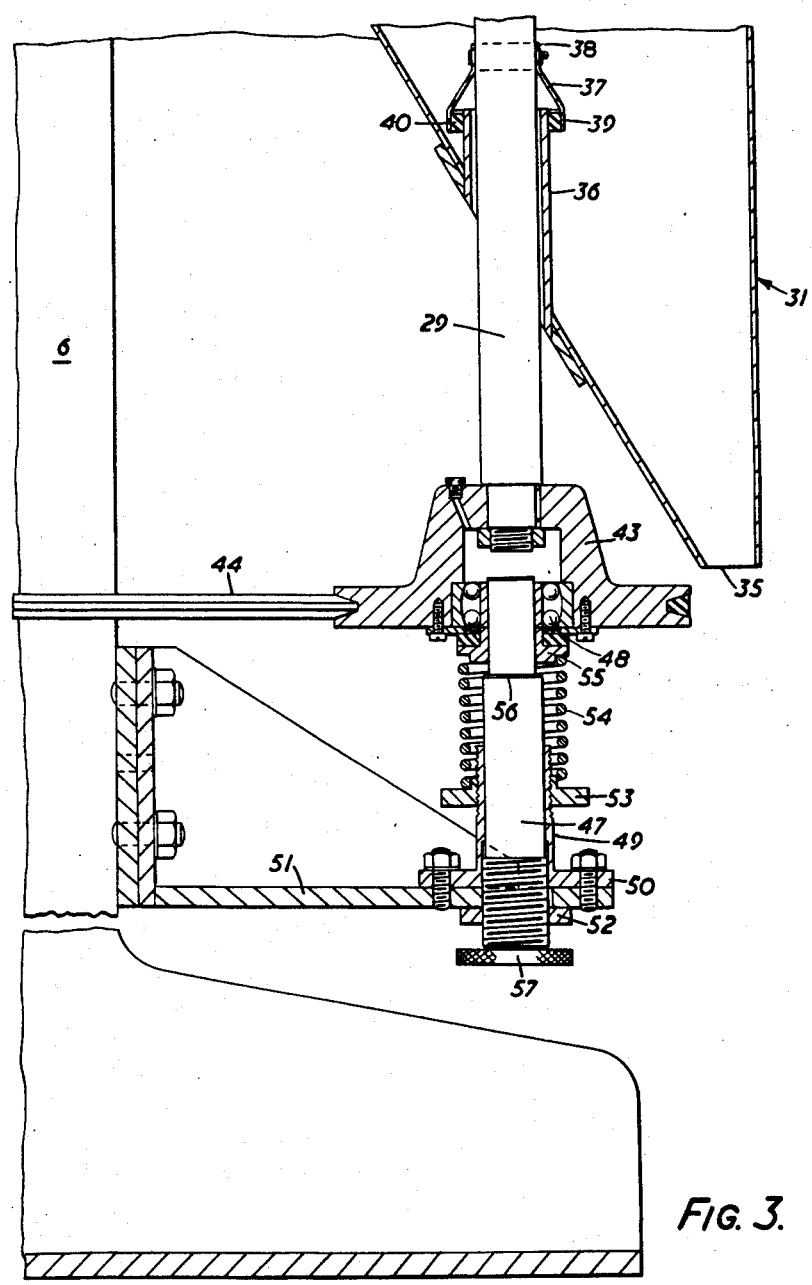
FIG. 3 is an axial section of the lower part of the apparatus shown in FIG. 1.

Secured to the lower end of the axle box 4 in which the tubular member 1 is journalled, is the upper part 30 of a housing, which is indicated generally by the reference numeral 31. The upper part 30 of the housing 31 is of rectangular section and terminates at the upper end in an inwardly extending flange 32, which is bolted to the underside of an outwardly extending flange 33 on the axle box 4. At its lower end, the upper part 30 of the housing 31 is secured to a lower part 34 of the housing 31. On three sides, the walls of the lower part 34 of the housing 31 are vertical and form a continuation of the upper part 30. On the fourth side (the lefthand side as seen in FIGS. 1–3), the lower part 34 of the housing 31 slopes across to form a steeply sloping floor, which leads to an outlet 35 situated at the foot of the opposite vertical wall of the lower part 34 of the housing.

The vertical shaft 29 passes freely through an aperture in the sloping floor of the housing 31 from which a cylindrical sleeve 36 extends upwards coaxially with and surrounding the shaft 29. Secured to the shaft 29 above the top of the sleeve 36 is a generally frusto-conical sealing member 37, which tapers upwardly and terminates at its upper and lower ends in upwardly and downwardly extending cylindrical flanges 38 and 39 respectively. The upper cylindrical flange 38 fits around and is clamped to the shaft 29, and the lower cylindrical flange 39 is situated outside the uppermost part of the sleeve 36. Between the lower cylindrical flange 39 and the adjacent part of the sleeve 36 there is provided a resilient sealing ring 40. To complete the sealing of the housing 31, a sealing ring 41 is provided between the cylindrical part 2 of the tubular member 1 and the axle box 4 close to the bottom thereof. A further sealing ring 42 is provided between the cylindrical part 2 of the tubular member 1 and the axle box 4 close to the top thereof.

The lower end of the vertical shaft 29 is secured to a raised central boss on a pulley 43, which has a circumferential groove in which there runs an endless driving belt 44. The endless driving belt 44 also runs around a pulley 45 on a driving shaft 46 coupled to a second driving motor (not shown). Extending vertically upwards into the recessed central part of the pulley 43 is a fixed shaft 47, between which and the pulley 43 there is interposed a double-row self-aligning radial ball bearing 48.

The lower part of the fixed shaft 47 is screw-threaded and engages the internally screw-threaded lower part of a sleeve 49. At its lower end, the sleeve 49 has an outwardly extending annular flange 50, which is bolted to a bracket 51. The bracket 51 is in turn bolted to the main frame 6. Below the bracket 51, there is a lock nut 52 on the threaded part of the fixed shaft 47. The upper part of the sleeve 49 is externally screw-threaded and carries an internally screw-threaded collar 53, which forms a seating for the lower end of a coil spring 54, which surrounds the fixed shaft 47 and of which the upper end rests on the underside of a collar 55. The collar 55 is slidably mounted on the upper part of the fixed shaft 47 and the upper side of the collar 55 bears against the inner race of the ball bearing 48. The centre part of each of the collars 53 and 55 is of increased thickness to provide a portion which projects within the adjacent end portion of the spring 54 and serves to locate the spring 54 laterally. By screwing the collar 53 up or down on the sleeve 49, the degree of compression of the spring 54, and therefore, the static load exerted by the guide ring 23 on the balls 22, can be increased or decreased respectively.

The upper part of the fixed shaft 47 is of reduced diameter to form a shoulder 56 which, by engaging the lower end face of the collar 55, positively limits the downward movement of the collar 55 against the action of the spring 54. The position of the shoulder 56 can be varied by loosening the lock nut 52 and then turning the shaft 47 in the sleeve 49. In order to facilitate this operation, a knurled knob 57 is provided at the lower end of the shaft 47.

The apparatus operates in the following way. The tubular member 1 is driven in one direction by the motor that is coupled to the shaft 10, and the vertical shaft 29 is driven in the opposite direction by the motor that is coupled to the shaft 46. To a reasonable approximation, the rate of relative movement between the surfaces of the balls 22 and the grinding ring 19 is determined by the sum of the rotational speeds of the tubular member 1 and the vertical shaft 29, but the rate of rotation of the balls 22 about the said axis is determined by the difference between these two rotational speeds. Thus, by driving the tubular member 1 and the vertical shaft 29 at suitably chosen rotational speeds, it is possible to obtain both a high throughput (which requires a high rate of relative movement between the surfaces of the balls 22 and the grinding ring 19) and a reasonable power consumption (which requires that the balls 22 should be urged against the grinding ring 19 with a force that is just sufficient to give the desired disintegration). By making the two rotational speeds approximately equal, it is possible to arrange that the balls 22 rotate about the said axis at so slow a speed that the centrifugal force acting on them is negligibly small. The force urging the balls 22 against the grinding ring 19 is then only that exerted by the guide ring 23, and this can be accurately controlled by adjusting the degree of compression of the spring 54 by means of the collar 53.

The solid particles that are to undergo disintegration are introduced into the top of the feed tube 11 at a rate which is sufficiently low to ensure that there is no accumulation of particles, that is to say, so that substantially no particles are impeded during their passage through the disintegration zone by particles ahead of them and therefore the particles enter the disintegration zone in a thin layer (as hereinbefore defined) on the surface of the grinding ring 19.

The particles pass through the disintegration zone partly under the action of gravity and partly under the action of centrifugal force (as will be explained below) and the rate at which particles can be fed to the apparatus depends upon the extent to which centrifugal force assists their passage through the disintegration zone. This is determined by the rotational speed of the tubular member 1 and by the semi-angle of the frusto-conical surface in which the surface of the grinding ring 19 lies.

The particles fall down the feed tube 11 and onto the conical member 14, which spreads the particles out and imparts to them an outward component of velocity. Almost immediately after passing beyond the lower edge of the conical member 14, the particles enter the path of the vanes 21, which impart to the particles a tangential component of velocity. As a result of their tangential velocity, the particles are thrown outwards by the action of centrifugal force against either the frusto-conical inner surface of the annular insert 20 in which the vanes 21 are mounted or the surface of the grinding ring 19. The particles are maintained by centrifugal force in contact with the surface against which they are thrown by the vanes 21. In this way they are carried to the disintegration zone between the grinding ring 19 and the balls 22 where substantially all the particles go through a disintegrating process. The ground particles fall to the outlet 33, either directly or by running down the floor of the lower part 34 of the housing 31.

Referring to FIG. 5 of the drawings, the second form of apparatus is similar to the first form except that the balls 22 are replaced by rollers 58 and the guide ring 23 is replaced by a guide member 59 on which the rollers 58 are rotatably mounted and which is secured to the shaft 29 (not shown in FIG. 5). This apparatus operates in the same way as the first form of apparatus.

Referring to FIG. 6 of the drawings, the third form of apparatus is similar to the first form of apparatus except that an additional guide ring 23a and associated row of balls 22a are provided to form a second disintegration zone which lies outside the disintegration zone associated with the row of balls 22. The inner surface of the guide ring 23a forms an extended disintegration surface for the balls 22. Within the feed tube 11 (not shown in FIG. 6), there is provided an inner feed tube 11a of which the lower end portion is flared outwardly and, in operation, some of the solid particles are fed between the inner feed tube 11a and the feed tube 11. These particles are deflected outwardly by the lower end portion of the inner feed tube 11a and pass through the paths of additional vanes 21a to the outer disintegration zone. The remaining solid particles are fed down the inside of the inner feed tube 11a and are directed outwardly by the conical member 14 through the path of the vanes 21 to the inner disintegration zone. The tubular member 1 and the shaft 29 are driven in the same direction, and the guide ring 23a is driven in the opposite direction. The guide ring 23a may be driven independently of the tubular member 1 and the shaft 29, or it may be driven from either the tubular member 1 or the shaft 29 by a mechanism such as, for example, that shown in FIG. 8, which is described hereinafter.

Referring to FIG. 7 of the drawings, the fourth form of apparatus is similar to the first form except that an additional guide ring 23b and associated row of balls are provided to form a second disintegration zone through which the particles pass after they have passed through the first disintegration zone. An additional set of vanes 21b are provided between the two disintegration zones. The apparatus operates in the same way as the first form of apparatus except that the particles pass through two disintegration zones.

Referring to FIG. 8 of the drawings, the fifth form of the apparatus is similar to the first form of apparatus except that the tubular member 1 and the shaft 29 are not driven independently. A gear wheel 60, which is fixed on the shaft 29, engages an idler gear 61, which is freely rotatably mounted in a cage 62, which is rotatably, but not slidably, mounted on the shaft 29. The idler gear 61 engages an internal gear 63, which is fixed to the tubular member 1. Thus, when the tubular member 1 rotates in one direction, the shaft 29 rotates in the opposite direction and it is only necessary to drive either the tubular member 1 or the shaft 29.

Each of the forms of apparatus described above, with the exception of the second form, can be modified as shown in any one of FIGS. 9 to 15. Thus, the extended disintegration surface may terminate at the level of the centres of the balls 22 (see FIG. 9), or above that level (see FIGS. 10 and 13), which facilitates the free and rapid removal of the ground particles from the disintegration zone, and may be shaped so that the balls 22 make contact with it over an area (see FIGS. 13 and 14). The guide ring 23 may also be shaped to make contact with the balls 22 over an area (see FIGS. 10 and 14). The balls 22 may be replaced by rollers 64 which are not rotatably mounted on a guide member (see FIGS. 11, 12 and 15). The rollers 64 may be cylindrical (see FIG. 15) or frusto-conical, when they may taper either downwardly (see FIG. 11) or upwardly (see FIG. 12).

Each of the forms of apparatus described above may also be modified in a number of other ways. Thus the vanes 21, 21a and 21b may, instead of being plane, be shaped to act as a fan. They then exert a classifying action on the particles because the finer particles tend to be blown through the spaces between the balls instead of being held against the extended disintegration surface. Another way of obtaining this classifying action is to make the vanes 21, 21a and 21b hollow, to provide apertures in the undersides of the vanes and to suck air in through these apertures by maintaining a reduced pressure within the hollow interiors of the vanes.

I claim:

1. Apparatus for disintegrating solid particles, which comprises an extended disintegration member having an extended disintegration surface in the form of a surface of revolution, the surface being generated by a line, the direction of which everywhere has a component parallel to the axis of the surface, a series of rotary disintegration members arranged about the axis of the extended disintegration surface, guide means continuously urging the rotary disintegration members against the extended disintegration surface, driving means for causing the extended disintegration member to rotate about the said axis, and feeding means for feeding the particles onto the extended disintegration surface in such manner that they have a component of revolution about the said axis in the same direction as the direction of rotation of the extended disintegration member, that they are maintained in contact with the extended disintegration surface by centrifugal force until they enter the distintegration zone between the extended disintegration surface and the surfaces of the rotary disintegration members and that they enter the disintegration zone in a thin layer, the diameter of the extended disintegration surface increasing continuously through the disintegration zone in the direction of feed of the particles.

2. Apparatus for disintegrating solid particles, which comprises an extended disintegration member having an extended disintegration surface in the form of a surface of revolution, a series of balls arranged about the axis of the extended disintegration surface, a guide ring continuously urging the balls against the extended disintegration surface, the guide ring having two surfaces which are inclined to one another and each of which makes only point contact with each ball, driving means for causing the extended disintegration member to rotate about the said axis, and feeding means for feeding the particles onto the extended disintegration surface in such manner that they have a component of revolution about the said axis in the same direction as the direction of rotation of the extended disintegration member, that they are maintained in contact with the extended disintegration surface by centrifugal force until they enter the disintegration zone between the extended disintegration surface and the surfaces of the balls and that they enter the disintegration zone in a thin layer, the diameter of the extended disintegration surface increasing continuously through the disintegration zone in the direction of feed of the particles.

3. Apparatus for disintegrating solid particles, which comprises an extended disintegration member having an extended disintegration surface in the form of a tapering surface of revolution, a series of rotary disintegration members arranged about the axis of the extended disintegration surface, guide means for confining the rotary disintegration members to an annular region bounded externally by the extended disintegration surface, resilient means for urging the guide means axially in the direction of decreasing diameter of the extended disintegration surface to press the rotary disintegration members against the extended disintegration surface, positive stop means arranged to limit positively axial movement of the guide means in the opposite direction, driving means for causing the extended disintegration member to rotate about the said axis, and feeding means for feeding the particles onto the extended disintegration surface in such a manner that they have a component of revolution about the said axis in the same direction as the direction of rotation of the extended disintegration member, that they are maintained in contact with the extended disintegration surface by centrifugal force until they enter the disintegration zone between the extended disintegration surface and the surfaces of the rotary disintegration members and that they enter the disintegration zone in a thin layer, the diameter of the extended disintegration surface increasing continuously through the disintegration zone in the direction of feed of the particles.

4. Apparatus as claimed in claim 3, wherein the guide means is mounted so as to be rotatable about the said axis and there is provided additional driving means, independent of the first-mentioned driving means, for causing the guide means to rotate about the said axis.

5. Apparatus for disintegrating solid particles which comprises an extended disintegration member having an extended disintegration surface in the form of a surface of revolution, the surface being generated by a line, the direction of which everywhere has a component parallel to the axis of the surface, a series of rotary disintegration members arranged about the axis of the extended disintegration surface, guide means urging the rotary disintegration members against the extended disintegration surface and confining the rotary disintegration members to an annular region bounded externally by the extended disintegration surface, driving means for causing the extended disintegration members to rotate about the said axis, a plurality of vanes fixed to the extended disintegration member so that they rotate about the said axis in the direction of rotation of the extended disintegration member, and feeding means for feeding the particles onto the extended disintegration surface through the path of the vanes so that the particles acquire a component of revolution about the said axis in the same direction as the direction of rotation of the extended disintegration member and that they are maintained by centrifugal force in the form of a thin layer on the extended disintegration surface until they enter the disintegration zone, the diameter of the extended disintegration surface increasing continuously through the disintegration zone in the direction of feed of the particles.

6. Apparatus as claimed in claim 5, wherein the axis of the extended disintegration surface is vertical, the vanes are mounted vertically and terminate at the top in sharp edges, and the feeding means comprises an upwardly tapering conical member mounted above the vanes so that its axis coincides with the axis of the extended disintegration surface and a conduit mounted co-axially with and above the conical member for feeding the solid particles onto the surface of the conical member.

7. Apparatus for disintegrating solid particles which comprises an extended disintegration member having a first exttended disintegration surface in the form of a tapering surface of revolution, a first series of rotary disintegration members arranged about the axis of the extended disintegration surface, a ring mounted co-axially with the extended disintegration member and arranged to confine the first series of rotary disintegration members to an annular region bounded externally by the first extended disintegration surface and to urge the first series of rotary disintegration members continuously against the first extended disintegration surface, a second series of rotary disintegration members arranged about the said axis and guide means arranged to urge the second series of rotary disintegration members continuously against a second extended disintegration surface that forms the inner surface of the said ring and is in the form of a surface of revolution of which the axis coincides with the axis of the first extended disintegration surface and which tapers in the same direction as the first extended disintegration surface, resilient means for urging the guide means axially in the direction of decreasing diameter of the extended disintegration surfaces to press the second series of rotary disintegration members against the second extended disintegration surface and so to cause the ring to press the first series of rotary disintegration members against the first extended disintegration surface, positive stop means arranged to limit positively axial movement of the guide means in the opposite direction, driving means for causing the extended disintegration member and the ring to rotate about the said axis at different velocities, and feeding means for feeding some of the particles onto the first extended disintegration surface and the remainder of the particles onto the second extended disintegration surface in such a manner that each of the particles has a component of revolution about the said axis in the same direction as the direction of rotation of the extended disintegration member or ring having the extended disintegration surface onto which the particle is fed, that the particles are maintained in contact with the extended disintegration surfaces by centrifugal force until they each enter one of the two disintegration zones formed by the two extended disintegration surfaces and the two series of rotary disintegration members and that they each enter one of the disintegration zones in a thin layer, the diameter of the first and second extended disintegration surfaces increasing continuously through the respective disintegration zones in the direction of feed of the particles.

References Cited in the file of this patent

UNITED STATES PATENTS

| | | |
|---|---|---|
| 533,971 | Sutherland | Feb. 12, 1895 |
| 563,733 | Behrend | July 14, 1896 |
| 1,040,769 | Sackett | Oct. 8, 1912 |
| 2,318,175 | Lynch | May 4, 1943 |

FOREIGN PATENTS

| | | |
|---|---|---|
| 10,599 | Great Britain | 1902 |